No. 765,459.

Patented July 19, 1904.

UNITED STATES PATENT OFFICE.

PHILIPPE CHUIT, OF GENEVA, SWITZERLAND, AND FRITZ BACHOFEN, OF NEW YORK, N. Y., ASSIGNORS TO THE FIRM OF CHUIT NAEF & CO., OF GENEVA, SWITZERLAND.

PROCESS OF MAKING CYCLIC KETONES.

SPECIFICATION forming part of Letters Patent No. 765,459, dated July 19, 1904.

Application filed February 9, 1903. Serial No. 142,689. (No specimens.)

*To all whom it may concern:*

Be it known that we, PHILIPPE CHUIT, residing at the Usine de la Queue d'Arve, Geneva, Switzerland, and FRITZ BACHOFEN, residing at the Helvetia Chemical Company, 15 Platt street, New York, State of New York, have invented new and useful Improvements in Processes for the Transformation of Hydrolized Pseudoionone and its Homologues into Cyclic Ketones, of which the following is a specification.

The hydrolized pseudoionone and its homologues themselves may no doubt be obtained by various methods; but they are very easily obtainable by the action of concentrated acids, preferably phosphoric or sulfuric acids, at a low temperature on pseudoionone or its homologues, not as has hitherto been done—viz., by adding the pseudoionone gradually to the cooled acid—but, on the contrary, by letting the acid run drop by drop into the pseudoionone kept cooled, the mixture being constantly agitated. It has been ascertained that under these conditions the pseudoionone and its homologues are transformed into new derivatives by water fixation. This transformation takes places with an excellent yield.

It is important to operate as indicated in order that the pseudoionone or one of its homologues—methylpseudoionone, dimethylpseudoionone, &c.—according with which one operates, shall not at the beginning of the transformation be brought into contact with a large excess of acid, which would of course occur if one of these products was gradually added to the acid, and, on the other hand, it is also advantageous to use a smaller quantity of acid than that generally employed to obtain ionone. The formation of such hydrolized products as intermediate products between pseudoionone and ionone has been hypothetically admitted by Barbier and Bouveault (monohydrolized product) and Tiemann and Krüger, (dihydrolized product.)

The hydrolized product from pseudoionone, with the following formula $C_{13}H_{22}O_2$, is a yellowish liquid, thick and syrupy at ordinary temperature, nearly odorless, with a density of 0.960 at 15° centigrade. It distils at 176° to 178° centigrade (n. c.) under 9 millimeters pressure and yields a semicarbazone melting at 144° centigrade.

The hydrolized methylpseudoionone prepared with methylpseudoionone of 0.896 density at 20° centigrade obtained by condensation of citral and methylethylketone by means of condensing agents—such as ethylate of sodium, peroxid of sodium, or sodium amid—possesses a density of 0.950 at 20° centigrade and boils at 186° to 192° centigrade (n. c.) under 12.5 millimeters pressure. Its semicarbazone is for the most part oily.

The methylpseudoionone the density of which is 0.912 at 20° centigrade, which is also obtained from citral and from methylethylketone, but by using a light solution of caustic soda as condensing agent and which is a mixture of several bodies, gives a hydrolized methylpseudoionone with a density of 0.956 at 20° centigrade and boiling at about 190° centigrade under 13.5 millimeters. This hydrolized methylpseudoionone yields abundantly with the semicarbazid a semicarbazone well crystallized and melting at 193° centigrade.

We have ascertained that the hydrolized products from the pseudoionone and its homologues may be easily transformed into cyclic derivatives containing one molecule less of water and are consequently excellent raw products to prepare the alpha and beta ionone or their homologues, which are thus obtained with an excellent yield and nearly free from hydrocarbids and resins, which always accompany these bodies when prepared directly from their pseudoionones. Among the bodies which easily provoke this transformation into cyclic ketones are, in the first place, concentrated phosphoric, formic, and sulfuric acids.

Example: (*a*) Two hundred and fifty parts of hydrolized pseudoionone are added gradually while constantly agitating to twelve hundred and fifty parts of syrupous phosphoric acid placed into a cooling mixture. The hydrolized pseudoionone dissolves entirely without causing much heating of the mixture, which becomes very thick. The mixture is left for half an hour, and then the temperature is raised up to 30° centigrade by warming the receptacle in which one operates from the outside. The mixture is afterward poured over ice and water. A thick syrupy brownish body separates itself, but is shortly afterward transformed by the action of the water into a yellow oil, which is distilled in steam after having previously been washed with water and afterward with carbonate of soda. The raw oil which is obtained dried in vacuum possesses a density of 0.935 at 20° centigrade, and once distilled in vacuum the density is 0.933. It is nearly pure alpha-ionone.

(b) One hundred parts of hydrolized pseudoionone are mixed with five hundred parts of formic acid, (one hundred per cent.) The solution, which becomes easily clear without becoming warm, is afterward heated for half an hour on a water-bath, then poured into water and treated as above. Thus also particularly alpha-ionone is obtained.

(c) Two hundred and fifty parts of hydrolized pseudoionone are poured drop by drop into twelve hundred and fifty parts of sulfuric acid (seventy-five per cent.) cooled in a refrigerating mixture, care being taken to constantly stir the mixture during the addition. This ended, it is left for an hour. Then the temperature is raised to 20° centigrade and the whole poured over a mixture of ice and water. The oil thus obtained after being distilled in steam has a density of 0.940 at 20° centigrade. It distils in vacuum without leaving any residue. It is a body largely composed of beta-ionone. The homologues of the hydrolized pseudoionone treated with the same acids in a similar way also yield cyclic derivatives which are also homologues of alpha and beta ionone, according to whether phosphoric, formic, or sulfuric acid is used.

The alpha and beta methylionone derived from the hydrolized methylpseudoionone of a density of 0.950 at 20° centigrade (corresponding to the methylpseudoionone of 0.896 density) have the following properties:

|  | Distilling-point. | Density at 20° centigrade. | Semicarbazones. | P. br.-phenyl-hydrazone. |
|---|---|---|---|---|
| Alpha | 138° to 143° centigrade (n. c.) under 14 millimeters pressure. | 0.931 to 0.932. | Few crystals melting at about 198° centigrade, the remainder of the semicarbazone becomes solid after a certain time. | Oily. |
| Beta | 143° to 150° centigrade (n. c.) under 15 millimeters pressure. | 0.939 to 0.941. | Oil which becomes solid after a certain time. | Oily. |

The cyclic ketones derived from hydrolized methylpseudoionone with a density of 0.956 at 20° centigrade (corresponding to the methylpseudoionone with a density of 0.912, which is a mixture of several bodies) have the following properties:

|  | Distilling-point. | Density at 20° centigrade. | Semicarbazones. | P. br.-phenyl-hydrazones. |
|---|---|---|---|---|
| Alpha | 134° to 138° centigrade (n. c.) under 13 millimeters pressure. | 0.933 to 0.936. | Melting at 196° to 198° centigrade. | Melting at 120° to 123° centigrade. |
| Beta | 132° to 140° centigrade (n. c.) under 11 millimeters pressure. | 0.939 to 0.943. | At 165° centigrade. | 135° to 136° centigrade. |

We claim as our invention—

The herein-described process for the preparation of cyclic ketones, consisting in reacting on hydrolized pseudoionone and its homologues with concentrated acid, washing the products from the reaction with water, and then distilling said products to purify them, substantially as and for the purposes set forth.

In testimony that we claim the foregoing as our invention we have signed our names in presence of two subscribing witnesses.

PHILIPPE CHUIT.
F. BACHOFEN.

Witnesses as to signature of Philippe Chuit:
T. FIRMOWICH,
G. IMER.

Witnesses as to signature of F. Bachofen:
GEO. T. PINCKNEY,
S. T. HAVILAND.